United States Patent
Ahn et al.

(10) Patent No.: US 7,292,222 B2
(45) Date of Patent: Nov. 6, 2007

(54) TEMPLATE TYPE ELECTROPHORETIC DISPLAY AND METHOD OF MANUFACTURING THE SAME

(75) Inventors: Seong Deok Ahn, Daejeon (KR); Kyung Soo Suh, Daejeon (KR); Seung Youl Kang, Daejeon (KR); Yong Eui Lee, Seoul (KR); Chul Am Kim, Kyungki-do (KR); Meyoung Ju Joung, Daejeon (KR); Mi Kyung Kim, Daejeon (KR); Gun Hong Lee, Pohang (KR)

(73) Assignee: Electronics and Telecommunications Research Institute (KR)

( * ) Notice: Subject to any disclaimer, the term of this patent is extended or adjusted under 35 U.S.C. 154(b) by 639 days.

(21) Appl. No.: 10/715,774

(22) Filed: Oct. 14, 2003

(65) Prior Publication Data

US 2004/0085285 A1 May 6, 2004

(30) Foreign Application Priority Data

Oct. 31, 2002  (KR)  .................. 10-2002-0067049

(51) Int. Cl.
G09G 3/34  (2006.01)
(52) U.S. Cl. .................. 345/107; 345/86; 359/296
(58) Field of Classification Search .................. 345/71, 345/72, 86, 107; 359/296, 238
See application file for complete search history.

(56) References Cited

U.S. PATENT DOCUMENTS

| | | | |
|---|---|---|---|
| 5,917,646 A * | 6/1999 | Sheridon ..................... 359/296 |
| 5,961,804 A | 10/1999 | Jacobson et al. | |
| 6,262,706 B1 | 7/2001 | Albert et al. | |
| 6,327,072 B1 | 12/2001 | Comiskey et al. | |
| 6,577,433 B1 * | 6/2003 | Lin et al. ..................... 359/296 |
| 6,704,133 B2 * | 3/2004 | Gates et al. ................. 359/296 |
| 6,721,084 B2 * | 4/2004 | Kawai ......................... 359/296 |
| 6,738,050 B2 * | 5/2004 | Comiskey et al. .......... 345/173 |
| 6,781,745 B2 * | 8/2004 | Chung et al. ............... 359/296 |
| 6,816,146 B2 * | 11/2004 | Harada et al. .............. 345/107 |
| 2002/0036616 A1 * | 3/2002 | Inoue .......................... 345/107 |
| 2002/0130832 A1 * | 9/2002 | Baucom et al. ............. 345/107 |
| 2002/0141801 A1 * | 10/2002 | Shimoda et al. ............. 400/76 |
| 2003/0016429 A1 * | 1/2003 | Ikeda et al. .................. 359/238 |

* cited by examiner

*Primary Examiner*—Richard Hjerpe
*Assistant Examiner*—Kimnhung Nguyen
(74) *Attorney, Agent, or Firm*—Blakely Sokoloff Taylor & Zafman

(57) ABSTRACT

An electrophoretic display and a method of manufacturing the electrophoretic display are provided. The electrophoretic display includes an lower electrode formed on an under layer, an lower electrode protection layer formed on the lower electrode, an insulating template formed on the lower electrode protection layer and having a plurality of holes of smaller size than the wavelength of visible rays region, a dielectric fluid filling the holes and having a color, a plurality of charged particles suspended in the dielectric fluid filling each of the plurality of holes having a color different from the color of the dielectric fluid, and an upper electrode formed on the insulating template in sequential order. Accordingly, a problem of agglomeration of the charged particles can be solved by the insulating template having holes of smaller size than the wavelength of visible rays region, and thus a reliable electrophoretic display emitting light of one color or natural colors is achieved.

12 Claims, 7 Drawing Sheets

TEMPLATE TYPE ELECTROPHORETIC DISPLAY AND METHOD OF MANUFACTURING THE SAME

BACKGROUND OF THE INVENTION

1. Field of the Invention

The present invention relates to electrophoretic displays (electronic papers) and manufacturing method thereof, particularly, template type electrophoretic displays and manufacturing method thereof.

2. Description of the Related Art

An electrophoretic display (electronic paper) which utilizes the phenomenon of electrophoresis to achieve contrast is an electronic-indicated display using movement of a charged particle in an applied electric field. It is possible to apply the electrophoretic display to displays such as electronic books, electronic dailies, electronic magazines, electronic publications, and information displaying media of mobile communication devices.

Electrophoresis refers to movement of charged particles in an applied electric field. When an electrophoresis occurs in a fluid, the charged particles move with a velocity determined primarily by the viscous drag of the particles, their charge, the dielectric properties of the fluid, and the magnitude of the applied electric field.

An electrophoretic display utilizes charged particles of one color suspended in a dielectric fluid medium of a different color to achieve contrast. In other words, when the electrodes are operated to apply an electric field across the medium, charged particles having opposite sign to each other migrate toward the electrode of opposite sign, respectively. The result is a visually observable color change.

Useful electrophoretic displays are bistable, their state persists even after the activating electric field is removed. Unfortunately, the stability of current electrophoretic displays is limited. Although flocculation or settling of particles can be avoided by matching the density of the particles with that of the fluid medium, long-term particle agglomeration and clustering remain a problem. Moreover, the problem becomes even worse when two particles of having different color and opposite sign to each other migrate by the electrophoresis phenomenon, which deteriorates the displays.

To solve the problems described above, in 1996, E-Ink Corporation in the U. S. A., which is separated from MIT Media Lab. in the U. S. A., has suggested electrophoretic displays based on microcapsules each having therein an electrophoretic elements of a dielectric fluid and a suspension of particles that visually contrast with the dielectric fluid and also exhibit surface charges. (U.S. Pat. Nos. 6,262,706, 6,262,833 and 5,916,804) The successful construction of an electrophoretic display requires the proper interaction of several different types of materials and processes. Materials such as a polymeric binder, a capsule membrane, and the electrophoretic particles and fluid must all be chemically compatible. However, the size of the encapsulated charged particles is 100-200 μm, and thus the problem of the charged particles clustering or agglomerating cannot be completely solved. In particular, the problem becomes even worse when two colored particles move by the electrophoresis phenomenon, which deteriorates the displays.

FIGS. 1A and 1B are sections of a conventional electrophoretic display.

FIG. 1A illustrates an encapsulated electrophoretic display when an electric field is not applied. In the electrophoretic display, a lower electrode 13 and a lower electrode protection layer 15 are formed on an under layer 11 that may be transparent or opaque. A microcapsule 17 is formed on the lower electrode protection layer 15. The microcapsule 17 comprises a transparent fluid 19, a white particle of positive charge 21, and a black particle of negative charge 23. The lower electrode protection layer 15 has functions of protecting the lower electrode 13 and separating the lower electrode 13 from the microcapsule 17. An upper electrode 25 is located on the microcapsule 17. A transparent upper layer 27 is formed on the upper electrode 25.

FIG. 1B illustrates an encapsulated electrophoretic display when an electric field is applied. When an electric field is applied between a lower electrode 13 and an upper electrode 25, the particles of positive charge 21 and negative charge 23 within the microcapsule 17 migrate toward an electrode of opposite sign. The migration of the charged particles causes a visually observable color change.

However, in the prior art, when two charged particles of different colors exist within the microcapsule 17, the electrophretic display has to keep the same specific gravities between two charged particles of different colors and a dielectric fluid, and also needs a chemical treatment to prevent between two charged particles from agglomerating. Such a chemical treatment is very difficult to handle since the difference in the specific gravities of the charged particles and the dielectric fluid causes floating or sediment of the charged particles in a specific time or the agglomeration or clustering of the charged particles, and eventually leads to a deterioration of a display.

SUMMARY OF THE INVENTION

The present invention provides a template type electriophoretic display having a plurality of holes having smaller size than the wavelength of visible rays region for preventing charged particles from agglomerating or clustering in an encapsulated electriophoretic display.

The present invention also provides a method of manufacturing the template type electriophoretic display.

In an aspect, the present invention provides the template type electrophoretic display in which a lower electrode is located on an under layer and a lower electrode protection layer is formed on the lower electrode. The insulating template having a plurality of holes having smaller size than the wavelength of visible rays region is formed on the lower electrode protection layer. A plurality of particles and/or a dielectric fluid within holes have a visually observable one color. The charged particles of different color among the plurality of holes template operate according to an applied electric field, and are suspended in the dielectric fluid. An upper electrode protection layer and an upper electrode are located on the insulating template in sequential order.

The charged particles can be composed of substances having the same specific gravity as the dielectric fluid. The charged particles are smaller than the holes in the insulating template. The charged particles within the hole can be red, green, and blue and achieve natural colors by scattering or absorbing a specific color.

The lower electrode and the upper electrode can be made in a pixel type according to the insulating template. The diameter of the holes in the insulating template is 10-400 nm. A separation distance between holes in the insulating template is less than 100 nm. The thickness of the insulating template is 10-1000 μm.

The lower electrode is composed of at least one electrode. The lower electrode is composed of an opaque inorganic material, an opaque organic material, or a combination of opaque inorganic and organic materials. The lower electrode is composed of a transparent inorganic material, a transparent organic material, or a combination of transparent inorganic and organic materials. The upper electrode is composed of a transparent inorganic substance, a transparent organic substance or a combination of transparent inorganic and organic substances.

According to another aspect of the present invention, there is provided a method of manufacturing a template type electrophoretic display, the method comprising fabricating an insulating template having a plurality of holes of smaller size than the wavelength of visible rays region, adhering an electrode having a protection layer to one side of the insulating template with a binder, injecting electric ink, which has a plurality of charged particles of one color suspended in a dielectric fluid of another color, into the holes of the insulating template, and adhering another electrode having a protection layer to the other side of the insulating template, into which the electric ink is injected, with a binder.

The insulating template is formed by applying anodic oxidation to a metal layer or a metal substrate. The insulating template is a polymer template which is formed by pouring a polymer into a mold of a template which is formed by applying anodic oxidation to a metal layer or a metal substrate. The mold is formed of a metal, a polymer or an oxide material. The binder is a thermosetting polymer or an ultraviolet ray setting polymer.

The electric ink is injected into the holes in the insulating template by applying or reducing gas pressure. The electric ink is injected into the holes in the insulating template by fluid flow.

As described above, the electrophoretic display according to the present invention uses an insulating template including a plurality of holes having smaller size than the wavelength of visible rays region for preventing charged particles from agglomerating or clustering in an electriophoretic display. Thus, the electrophoretic display according to the present invention can achieve reliable one color or natural colors.

BRIEF DESCRIPTION OF THE DRAWINGS

The above and other aspects and advantages of the present invention will become more apparent by describing in detail-preferred embodiments thereof with reference to the attached drawings in which.

DETAILED DESCRIPTION OF THE INVENTION

Figure 1A:
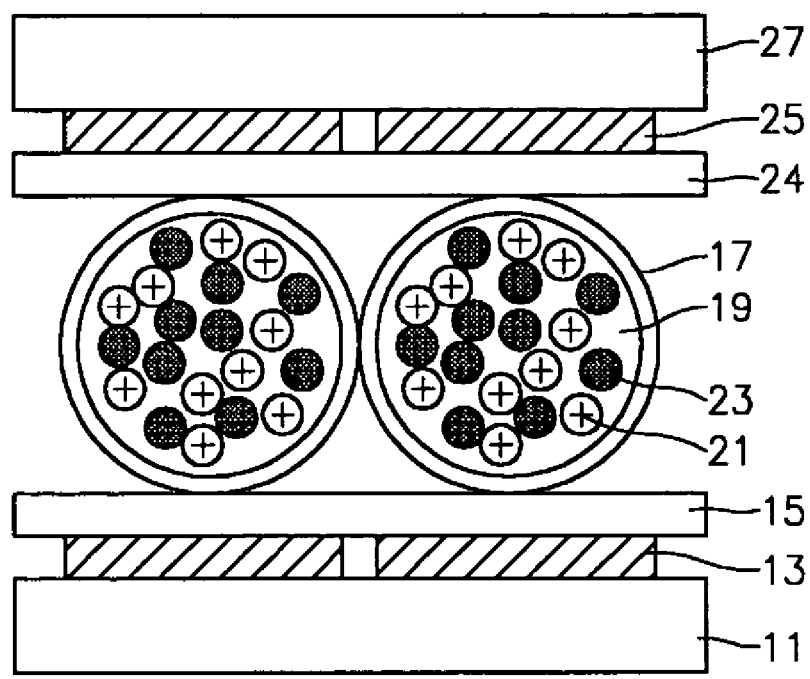
FIGS. 1A and 1B are sections of a conventional electrophoretic display.
Figure 1B:
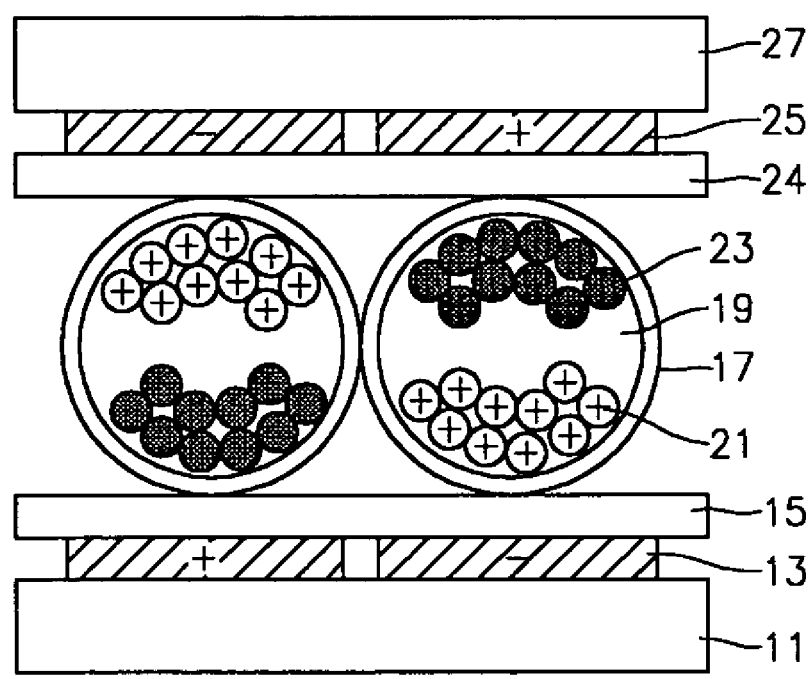

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thickness of layers and regions may be exaggerated for clarity. It will also be understood that when a layer is referred to as being "on" another layer or substrate, it can be directly on the other layer or substrate, or intervening layers may also be present.

Figure 2A:
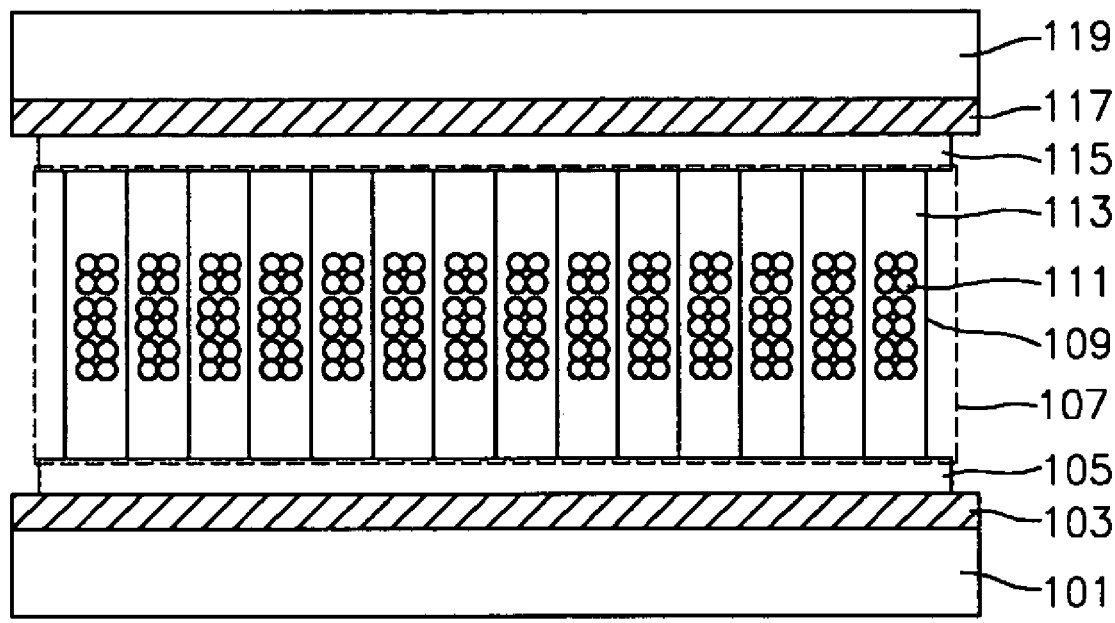
FIGS. 2A through 2C are cross-sections of a template type electophoretic display according to a preferred embodiment of the present invention.
Figure 2B:
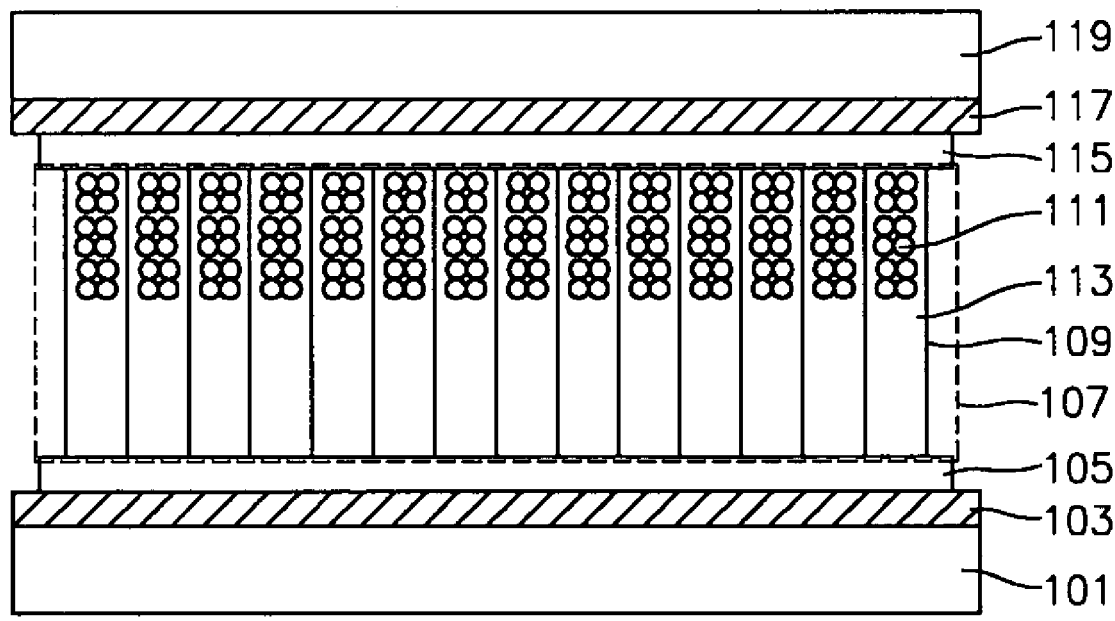
Figure 2C:
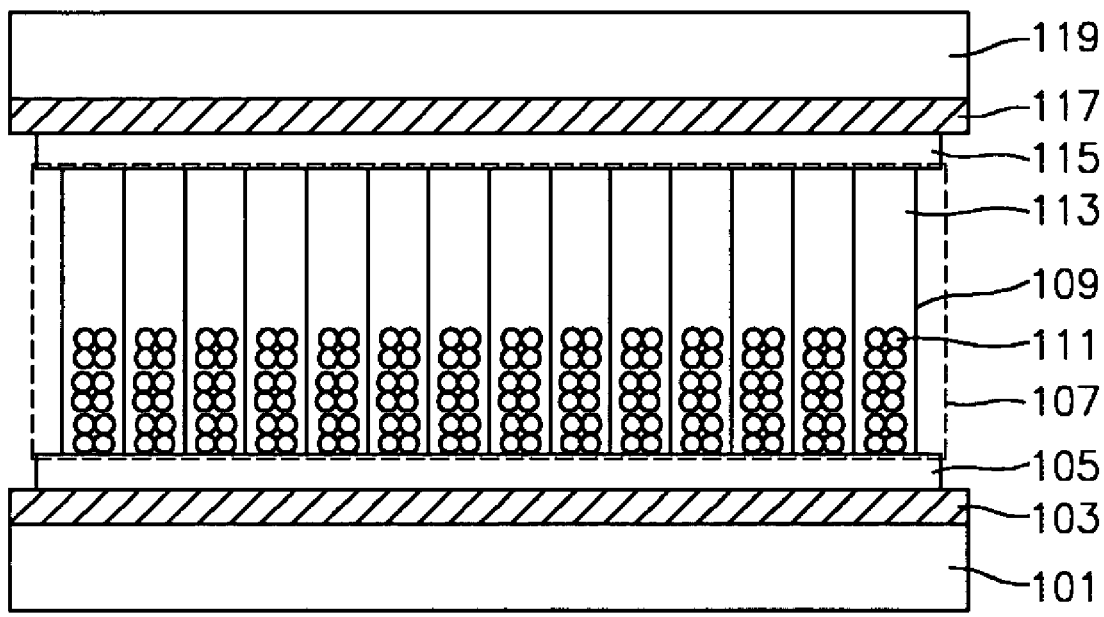

FIGS. 2A through 2C are cross-sections of a template type electrophoretic display according to an embodiment of the present invention.

Referring to FIG. 2A, in an electrophoretic display to which an electric field is not applied, a lower electrode 103 and a lower electrode protection layer 105 are formed on an under layer 101.

The under layer 101 is composed of a nontransparent substance. The lower electrode 103 is composed of at least one electrode. The material of the lower electrode 103 may be opaque or transparent and may be inorganic, organic, or a combination of inorganic and organic substances. The lower electrode protection layer 105 has functions of protecting the lower electrode 103, separating the lower electrode 103 from an insulating template 107 and preventing charged particles from being attached to the lower electrode 103.

The insulating template 107, which has a plurality of holes 109 for transmitting light having wavelength shorter than visible rays region, i.e., smaller than 400 nm in diameter, is formed on the lower electrode protection layer 105. In this embodiment, the holes 109 in the insulating template 107 are 10-400 nm. Spaces between holes 109 are below 100 nm and, preferably, are as small as possible. The height of the insulating template 107 is 10-1000 μm.

An electric ink are included in the holes 109, having a dielectric fluid 113 of a single color and charged particles 111 that have a different color from the dielectric fluid 113, operate differently according to an electric field, and are suspended in the dielectric fluid 113.

The dielectric fluid 113 may either scatter or absorb light, and may be inorganic, organic, or a combination of inorganic and organic substances.

The charged particles 111 are smaller than the holes 109 in the insulating template 107, they either scatter or absorb light, and may be organic or inorganic. Also, the charged particles 111 have the same specific gravity as the dielectric fluid 113.

An upper electrode protection layer 115, an upper electrode 117 and a transparent upper layer 119 are sequentially formed on the insulating template 107. The upper electrode 117 is transparent and may be inorganic, organic, or a combination of inorganic and organic substances. The upper electrode protection layer 115 has functions of protecting the upper electrode 117, separating the upper electrode 117 from the insulating template 107 and preventing the charged particles 111 from being attached to the upper electrode 117.

Referring to FIGS. 2B and 2C, which show the electrophoretic display, when an electric field is applied, the charged particles 111 inside the holes 109 in the insulating template 107 move toward an electrode of opposite sign, thereby producing a visually observable color change. FIG. 2B shows a movement of the charged particles 111 toward the upper electrode 117, while FIG. 2C shows a movement of the charged particles 111 toward the lower electrode 103.

Also, the electrophoretic display according to one embodiment of the present invention produces natural colors by utilizing a phenomenon of electrophoresis.

That is, the natural colors are performed when charged particles 111 in the holes 109 of the insulating template 107 are composed of red (R), green (G), and blue (B) particles, and the particle scatter or absorb a specific color. Here, the charge particles 111 are inorganic or organic and can either reflect or absorb a specific color.

Figure 3A:
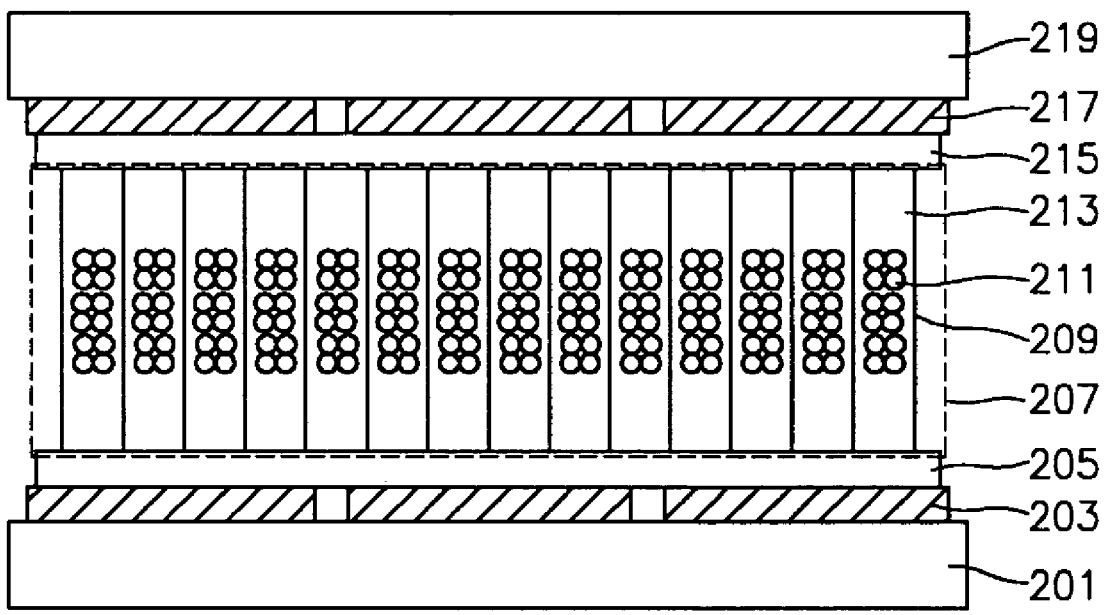
FIGS. 3A through 3C are sections of a template type electrophoretic display according to another preferred embodiment of the present invention.
Figure 3B:
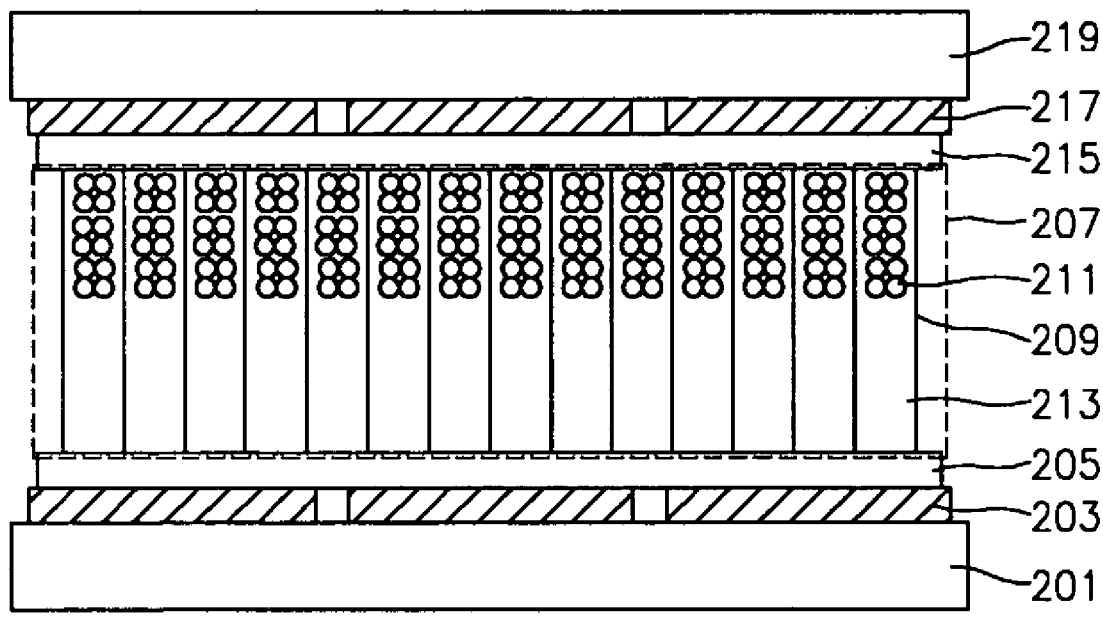
Figure 3C:
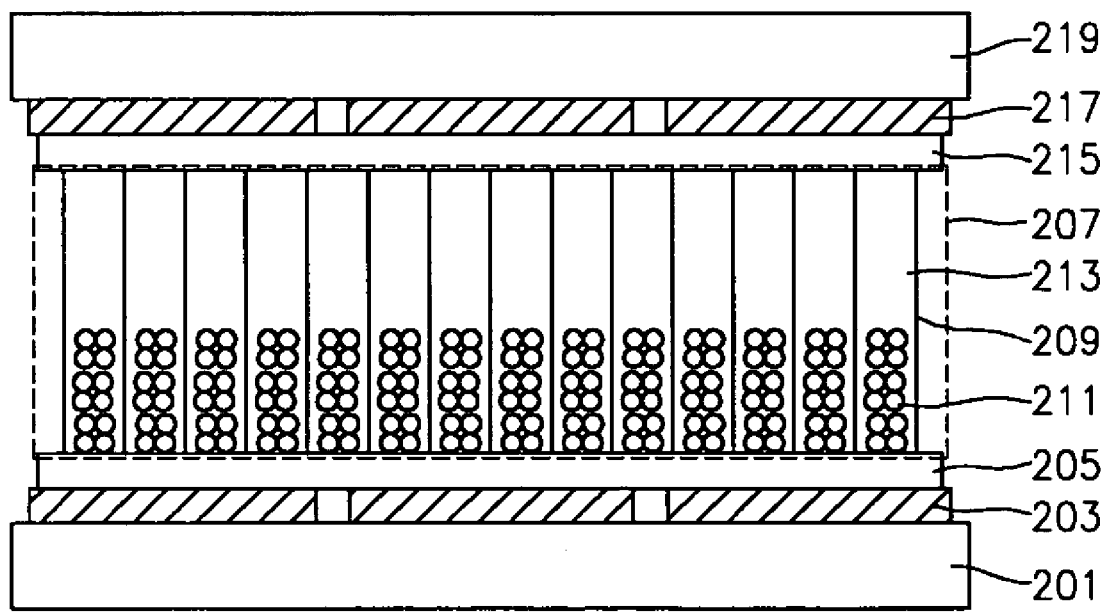

FIGS. 3A to 3C are cross-sections of a template type electrophoretic display according another embodiment of the present invention. In particular, FIGS. 3A to 3C are views of an example of the template type electrophoretic display operating in a pixel type.

Referring to FIG. 3A, which shows in a template type electrophoretic display according to another embodiment of the present invention to which an electric field is not applied, a lower electrode 203 divided into pixels and a lower electrode protection layer 205 are formed on an under layer 201.

The lower electrode 203 is composed of a nontransparent substance. The lower electrode 203 is composed of at least one electrode. The material of the lower electrode 203 may be opaque or transparent and may be inorganic, organic, or a combination of inorganic and organic substances.

The lower electrode protection layer 205 has functions of protecting the lower electrode 203, separating the lower electrode 203 from an insulating template 207 and preventing charged particles from being attached to the lower electrode 203.

The insulating template 207, which has a plurality of holes 209 of smaller size than the wavelength of visible rays region, i.e., smaller than 400 nm in diameter, is formed on the lower electrode protection layer 205. In this embodiment, the holes 209 in the insulating template 207 are 10-400 nm. Spaces between holes 209 are below 100 nm and, preferably, are as small as possible. The height of the insulating template 207 is 10-1000 µm.

An electric ink are included in the holes 209, having a dielectric fluid 213 of a single color and charged particles 211 that have a different color from the dielectric fluid 213, operate differently according to an electric field, and are suspended in the dielectric fluid 213.

The dielectric fluid 213 may either scatter or absorb light, and may be inorganic, organic, or a combination of inorganic and organic substances.

The charged particles 211 are smaller than the holes 209 in the insulating template 207, they either scatter or absorb light, and they may be organic or inorganic. Also, the charged particles 211 have the same specific gravity as the dielectric fluid 213.

An upper electrode protection layer 215, an upper electrode 217 and a transparent upper layer 219 are sequentially formed on the insulating template 207. The upper electrode 217 is transparent and may be inorganic, organic, or a combination of inorganic and organic substances. The upper electrode protection layer 215 has functions of protecting the upper electrode 217, separating the upper electrode 217 from the insulating template 207 and preventing the charged particles 211 from being attached to the upper electrode 217.

Referring to FIGS. 3B and 3C, which show the template type electrophoretic display, when an electric field is applied, the charged particles 211 inside the holes 109 in the insulating template 207 move toward an electrode of opposite sign, thereby producing a visually observable color change. FIG. 3B shows a movement of the charged particles 211 toward the upper electrode 217, while FIG. 3C shows a movement of the charged particles 211 toward the lower electrode 203.

Also, the electrophoretic display according to one embodiment of the present invention produces natural colors by utilizing a phenomenon of electrophoresis.

That is, the natural colors are performed when charged particles 211 in the holes 209 of the insulating template 207 are composed of red (R), green (G), and blue (B) particles, and scatter or absorb a specific color. Here, the charge particles 211 are inorganic or organic and can either scatter or absorb a specific color.

Figure 4:
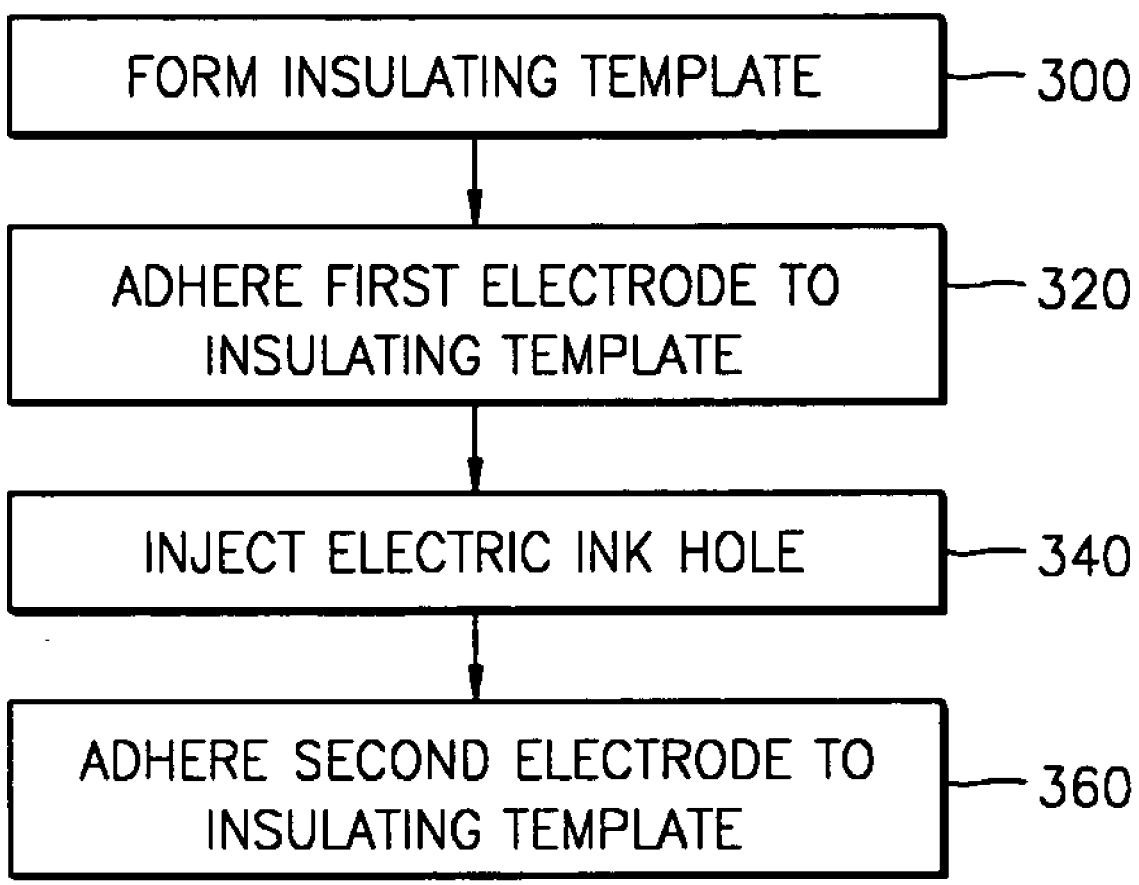
FIG. 4 is a flowchart of a method of manufacturing a template type electrophoretic display according to the present invention.

FIG. 4 is a flowchart of a method of manufacturing the template type electrophoretic display according to the present invention.

Firstly, an insulating template having a plurality of holes of smaller size than the wavelength of visible rays region is formed (step 300). The insulating template can be formed by anodic oxidizing a metal layer, such as an aluminum layer, or a metal substrate such as an aluminum substrate. Alternatively, the insulating template may be a polymer template which is formed by making a mold of the above insulating template and using it as a mold into which polymer is poured. Here, the mold may be a metal, a polymer or an oxide material. Formation of the insulating template will be described in detail later.

Next, a first electrode, i.e., an upper electrode or a lower electrode, which has a protection layer, is adhered to one side of the insulating template with a binder and the resultant structure is hardened (step 320). The binder may be a thermosetting polymer or an ultraviolet ray setting polymer.

Subsequently, electric ink having a dielectric fluid of a single color and charged particles that have a different visual color from the dielectric fluid, operates differently according to an electric field and is suspended in the dielectric fluid, is injected into the holes of the insulating template (step 340). Here, the electric ink can be injected into the holes of the insulating template by applying or reducing vapor pressure. In addition, the electric ink can be injected into the holes of the insulating template by fluid flow.

Next, a second electrode (an upper electrode or a lower electrode) which has a protection layer is adhered to the other side of the insulating template, into which the electric ink is injected, with a binder, and the resultant structure is hardened, thereby completing the manufacture of the electrophoretic display according to the present invention (step 360).

FIGS. 5A through 5E are cross-sections showing the forming of an insulating template that is used in the electrophoretic display of the present invention.

Figure 5A:
FIGS. 5A through 5E are cross-sections of forming an insulating template that is used in the electrophoretic display of the present invention.

Referring to FIG. 5A, a metal substrate 41, on which a metal panel such as an aluminum panel or a metal layer such as an aluminum layer is deposited, is prepared.

Figure 5B:
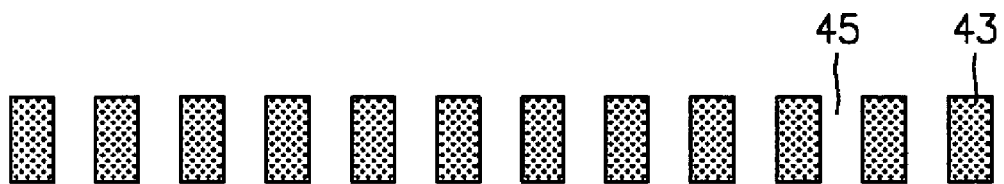

Referring to FIG. 5B, a plurality of holes 45 of are formed in the metal substrate 41. The holes 45 are formed by forming an anodic oxide layer 43 on the metal substrate 41. In order to form the anodic oxide layer 43, the metal substrate 41 is put into a phosphatic solution or an oxalic acid solution, and DC voltage of about 30-160V is applied to both a positive pole, i.e., aluminum, and a negative pole, i.e., platinum, of the metal substrate 41. Then, the aluminum is oxidized and transformed into alumina, $Al_2O_3$, that is used as a protection mask. The holes 45 having a diameter of about 10-200 nm are formed by forming the anodic oxide layer 43 composed of the alumina on the metal substrate 41. Therefore, the template, which includes the holes 45 of smaller size than the wavelength of visible rays region can be formed by using anodic oxidation.

Figure 5C:
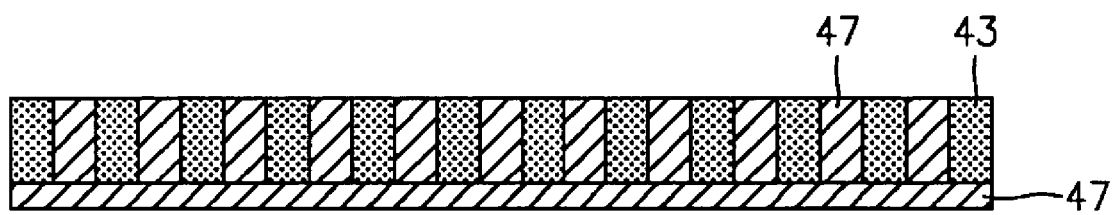
Figure 5D:
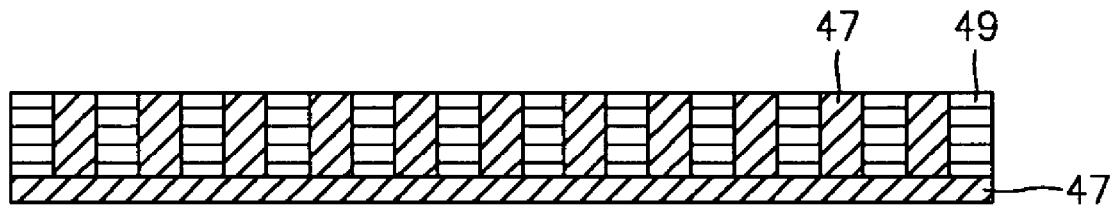
Figure 5E:
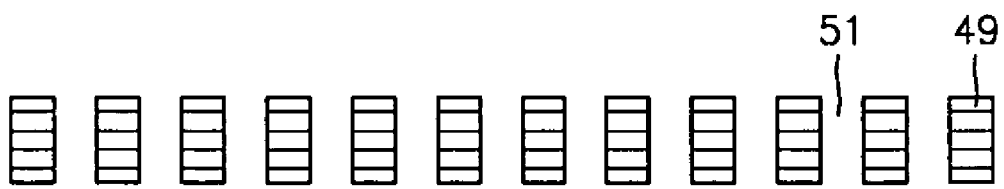

Such template, which includes the holes 45 and is formed by anodic oxidation, can be used in the electrophoretic display according to the present invention. However, such insulating templates of FIGS. 5A and 5B are likely to be broken when the electrophoretic display is manufactured. Therefore, a polymer template, which includes a plurality of holes 51 can be used in the electrophoretic display according to the present invention. The polymer template can be manufactured as shown in FIGS. 5C-5E.

A mold 47 made of metal is formed by using the insulating template that is formed by using anodic oxidation as shown in FIG. 5B. In this embodiment, the mold 47 is made of metal. However, the mold 47 may be made of polymer or oxide material. After the anodic oxide layer 43 is removed, an insulating polymer is poured into the mold 47, and then a polymer template 49 is formed as shown in FIG. 5D. Next, the mold 47 is removed, and then an insulating polymer template 49 which has holes 51 of smaller size than the wavelength of visible rays region is formed. In such a way, an insulating template having desired diameter and height can be formed.

Figure 6A:
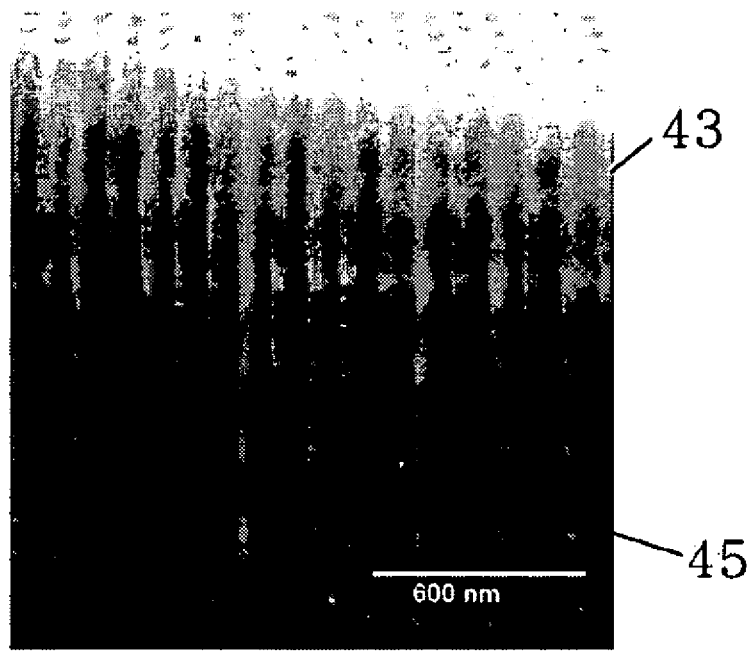
FIGS. 6A and 6B are a cross-section and a plane of the insulating template having a plurality of holes that is used in the electrophoretic display of the present invention.
Figure 6B:
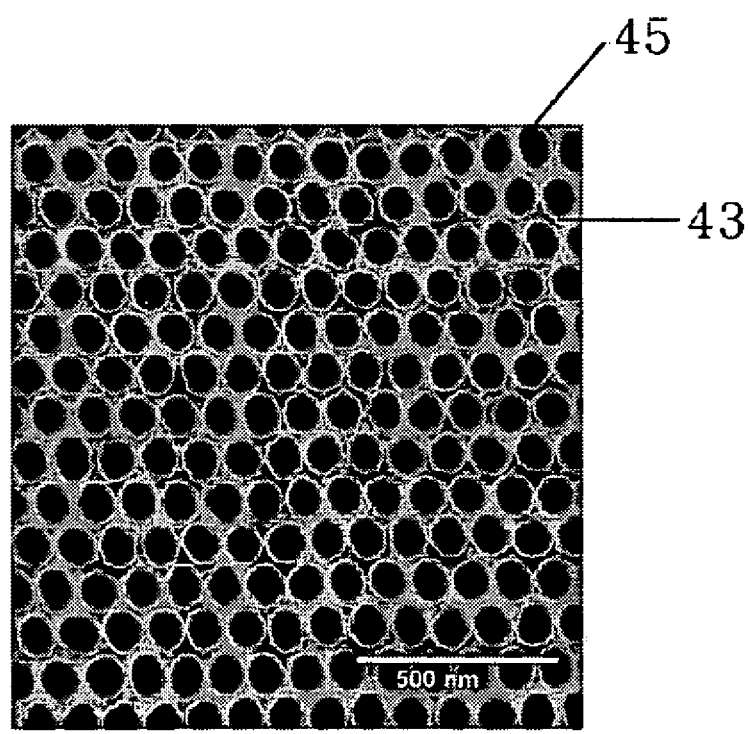

FIGS. 6A and 6B are a section and a plane of an insulating template having a plurality of holes that is used in an electrophoretic display of the present invention.

As shown in FIGS. 6A and 6B, holes 45 are distributed uniformly in alumina 43, which is formed by anodic oxidation.

According to the present invention, an electrophoretic display having an insulating template structure that includes holes of smaller size than the wavelength of visible rays region, i.e., smaller than 400 nm, can be effectively manufactured. Therefore, the present invention is capable of preventing clustering and agglomeration of charged particles. Thus, the electrophoretic display according to the present invention can operate stably for a long time, and contrast and reaction speed can be improved. In addition, the electrophoretic display can display one color or natural colors.

While this invention has been particularly described with reference to preferred embodiments thereof, it will be understood by those skilled in the art that various changes in form and details may be made therein without departing from the spirit and scope of the invention as defined by the appended claims and equivalents thereof.

What is claimed is:

1. A template type electrophoretic display comprising:
    a lower electrode formed on an under layer;
    a lower electrode protection layer formed on the lower electrode;
    an insulating template formed on the lower electrode protection layer and having a plurality of holes of smaller size than the wavelength of visible rays region;
    a dielectric fluid filling the holes and having a color;
    a plurality of charged particles suspended in the dielectric fluid filling each of the plurality of holes having a color different from the color of the dielectric fluid; and
    an upper electrode protection layer and an upper electrode formed on the insulating template in sequential order.

2. The electrophoretic display of claim 1, wherein the charged particles have the same specific gravity as the dielectric fluid.

3. The electrophoretic display of claim 1, wherein the lower electrode and the upper electrode are shaped to form an array of pixels corresponding to the plurality of holes in the insulating template.

4. The electrophoretic display of claim 1, wherein the charged particles are smaller than the holes in the insulating template.

5. The electrophoretic display of claim 1, wherein the charged particles are red, green or blue, scatter or absorb a specific color, and achieve natural colors.

6. The electrophoretic display of claim 1, wherein the diameter of the holes in the insulating template is 10-400 nm.

7. The electrophoretic display of claim 1, wherein a separation distance between holes in the insulating template is less than 100 nm.

8. The electrophoretic display of claim 1, wherein the thickness of the insulating template is 10-1000 μm.

9. The electrophoretic display of claim 1, wherein the lower electrode is composed of at least one electrode.

10. The electrophoretic display of claim 1, wherein the lower electrode is composed of an opaque inorganic material, an opaque organic material, or a combination of opaque inorganic and organic materials.

11. The electrophoretic display of claim 1, wherein the lower electrode is composed of a transparent inorganic material, a transparent organic material, or a combination of transparent inorganic and organic materials.

12. The electrophoretic display of claim 1, wherein the upper electrode is composed of a transparent inorganic substance, a transparent organic substance or a combination of transparent inorganic and organic substances.

* * * * *